(12) United States Patent
Chang et al.

(10) Patent No.: US 9,007,370 B2
(45) Date of Patent: Apr. 14, 2015

(54) COMPUTING DEVICE AND METHOD FOR PROCESSING CURVED SURFACE

(75) Inventors: Chih-Kuang Chang, New Taipei (TW); Xin-Yuan Wu, Shenzhen (CN); Hua-Hui Tang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 317 days.

(21) Appl. No.: 13/533,956

(22) Filed: Jun. 26, 2012

(65) Prior Publication Data

US 2013/0120377 A1    May 16, 2013

(30) Foreign Application Priority Data

Nov. 14, 2011  (CN) .......................... 2011 1 0359061

(51) Int. Cl.
*G06T 15/40* (2011.01)
*G06T 17/20* (2006.01)

(52) U.S. Cl.
CPC ............. *G06T 17/20* (2013.01); *G06T 2200/08* (2013.01)

(58) Field of Classification Search
USPC ........................................................ 345/419
See application file for complete search history.

(56) References Cited

U.S. PATENT DOCUMENTS

| 2009/0190811 | A1* | 7/2009 | Zheng et al. | 382/128 |
|---|---|---|---|---|
| 2009/0207179 | A1* | 8/2009 | Huang et al. | 345/505 |
| 2010/0060640 | A1* | 3/2010 | Melikian et al. | 345/427 |
| 2010/0063784 | A1* | 3/2010 | Chang et al. | 703/2 |
| 2010/0271369 | A1* | 10/2010 | Chang et al. | 345/423 |
| 2012/0035889 | A1* | 2/2012 | Lawitschka et al. | 703/1 |
| 2013/0271463 | A1* | 10/2013 | Curington et al. | 345/420 |

OTHER PUBLICATIONS

Bhoez et al., "The stencil buffer sweep plane algorithm for 5-axis CNC tool path verification", Computer-Aided Design 35 (2003), pp. 1129-1142.*

* cited by examiner

*Primary Examiner* — Xiao M. Wu
*Assistant Examiner* — Steven Elbinger
(74) *Attorney, Agent, or Firm* — Novak Druce Connolly Bove + Quigg LLP (57) ABSTRACT

A computing device meshes a curved surface into a plurality of triangles, records symbols and coordinate data of three vertexes of each triangle into a data structure of the triangle, and processes the data structures of the triangles by representing vertexes having the same coordinate data with the same symbol. The computing device recognizes inner triangles and surface triangles of the curved surface, deletes the inner triangles of the curved surface, and reads information recorded in the processed data structures of the surface triangles and outputs the surface triangles of the curved surface to a display device.

15 Claims, 8 Drawing Sheets

COMPUTING DEVICE AND METHOD FOR PROCESSING CURVED SURFACE

BACKGROUND

1. Technical Field

Embodiments of the present disclosure relates to computer aided design (CAD) methods, and more particularly to a computing device and a method for processing a curved surface.

2. Description of Related Art

Reconstruction of a three-dimensional (3D) object model is often based on curved surfaces of the 3D object. Often, the curved surfaces are created based on point data acquired from the 3D object and are meshed by triangles. During the meshing process, a large number of triangles may be produced on the outside surface of the curved surface (hereafter surface triangles, which can be seen) as well as on the inner surface of the curved surfaces (hereafter inner triangles, which cannot be seen), and more than one triangle may share the same vertex. The inner triangles, which contribute less in producing a surface texture of the 3D object model, may cause a huge amount of computation. Repetitive processing of the vertexes having the same coordinates also increases unnecessary computation.

DETAILED DESCRIPTION

The disclosure, including the accompanying drawings in which like references indicate similar elements, is illustrated by way of examples and not by way of limitation. It should be noted that references to "an" or "one" embodiment in this disclosure are not necessarily to the same embodiment, and such references mean "at least one".

In general, the word "module", as used herein, refers to logic embodied in hardware or software, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
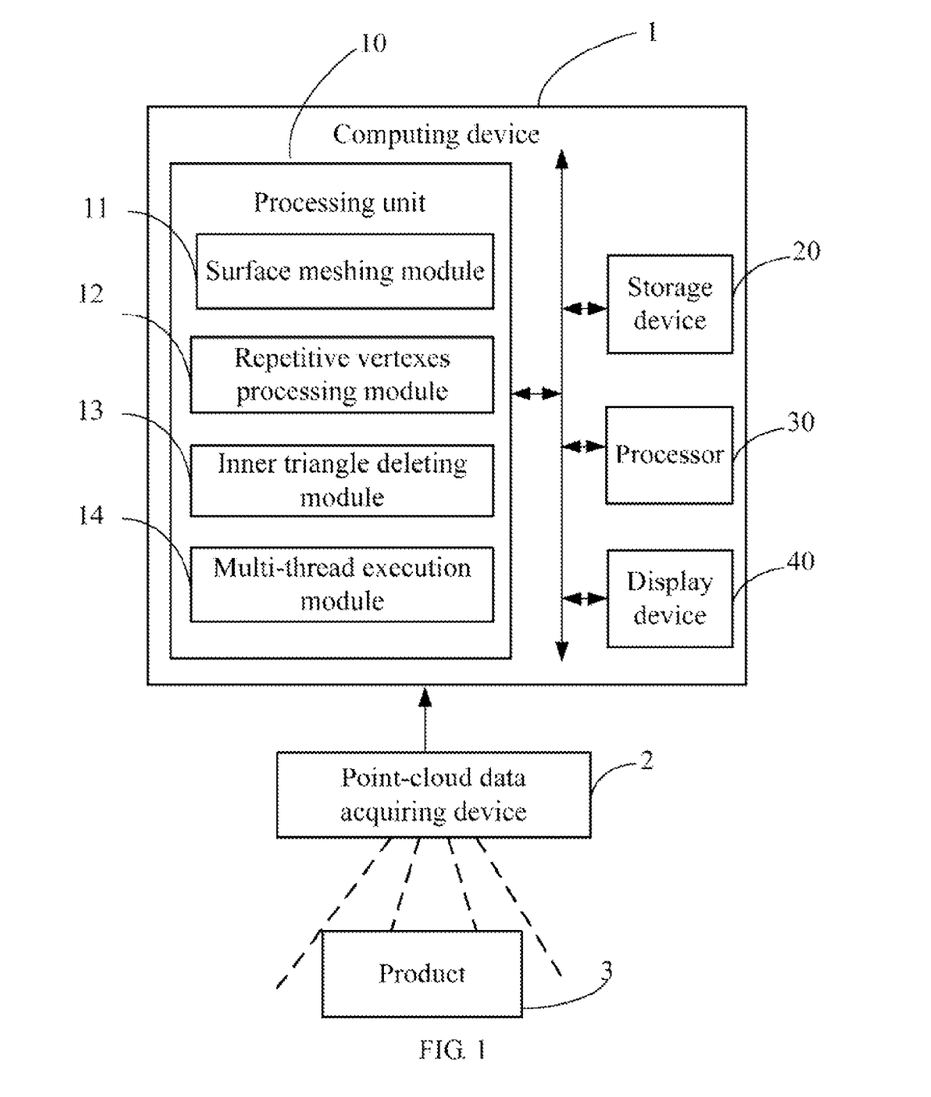
FIG. 1 is a block diagram of one embodiment of a computing device including a processing unit for processing a curved surface of a product.

FIG. 1 is a block diagram of one embodiment of a computing device 1. The computing device 1 includes a processing unit 10 for processing a curved surface of a product 3, a storage device 20, a processor 30, and a display device 40. These components communicate over one or more communication buses or signal lines. The computing device in FIG. 1 may have more or fewer components as shown in FIG. 1, or have a different configuration of components. As shown in FIG. 1, the computing device 1 is electronically connected to a point-cloud data acquiring device 2. The point-cloud data acquiring device 2 obtains point-cloud data of the product 3, and transmits the point-cloud data to the computing device 1. In this embodiment, the point-cloud data acquiring device 2 is a laser scanner. The computing device 1 may be a computer, or any other electronic device having data processing functions.

The processing unit 10 includes a surface meshing module 11, a repetitive vertexes processing module 12, an internal triangle deleting module 13, and a multi-thread execution module 14. The modules 11-14 may comprise computerized code in the form of one or more programs (computer-readable program code) that are stored in the storage device 20. The computerized code includes instructions that are executed by the processor 30 to create a curved surface of the product 3 based on the point-cloud data and process the curved surface. Functions of the modules 11-14 are described in FIG. 2 to FIG. 4. The storage device 20 may be a dedicated memory, such as an EPROM, a hard disk drive (HDD), or flash memory.

Figure 2:
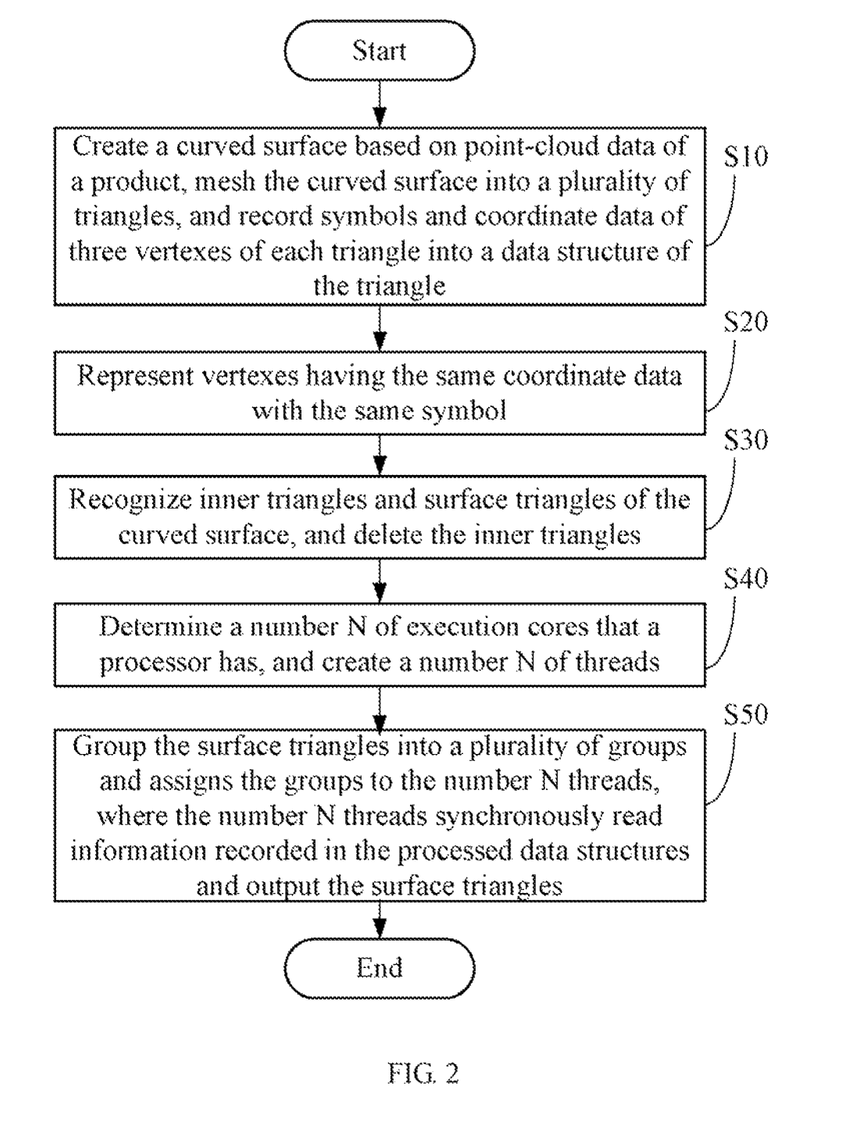
FIG. 2 and is a flowchart of one embodiment of a method for processing a curved surface of a product.

FIG. 2 is a flowchart of one embodiment of a method for processing a curved surface of the product 3. Depending on the embodiment, additional steps may be added, others removed, and the ordering of the steps may be changed.

In step S10, the surface meshing module 11 creates a curved surface based on point-cloud data of the product 3, meshes the curved surface into a plurality of triangles, and records symbols and coordinate data of three vertexes of each triangle into a data structure of the triangle. For example, a data structure of a triangle A may be [P1(x1,y1,z1), P2(x2,y2,z2), P3(x3,y3,z3)], a data structure of a triangle B may be [P4(x1,y1,z1), P5(x5,y5,z5), P6(x6,y6,z6)], where P1-P6 are symbols of vertexes of the triangles A and B.

Figure 3:
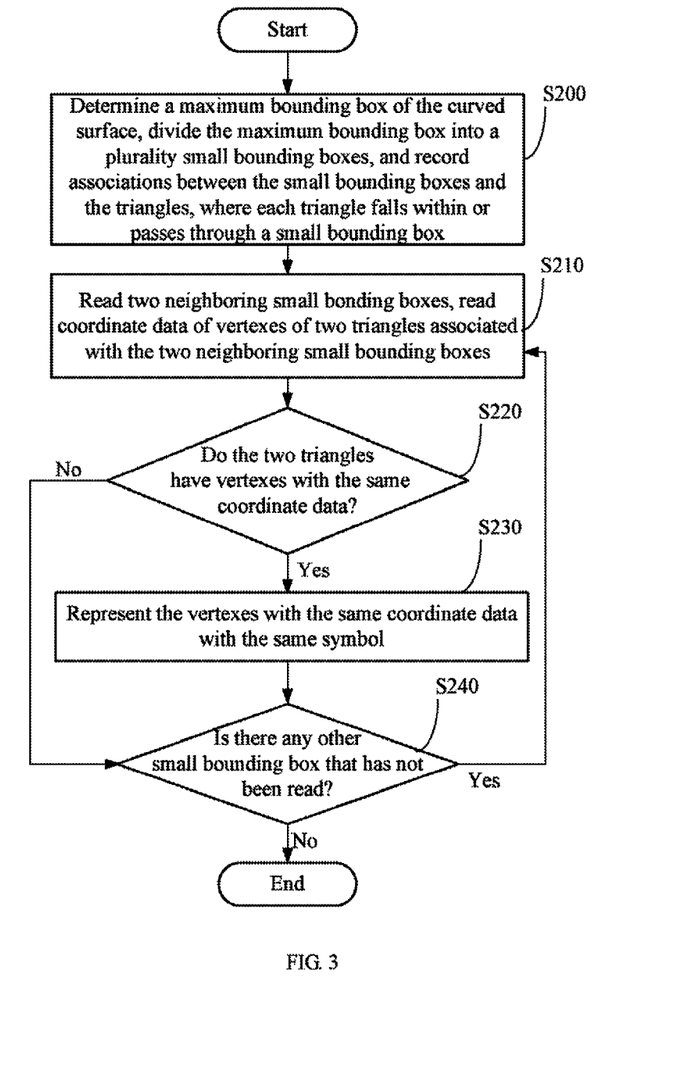
FIG. 3 is a detailed description of one step in FIG. 2.

In step S20, the repetitive vertexes processing module 12 processes the data structures of the triangles by representing vertexes having the same coordinate data with the same symbol (a detailed description is given in FIG. 3). The processor 30 skips over one or more vertexes that have the same coordinate data as a previously-processed vertex when outputting the triangles, so as to improve a speed for outputting the triangles of the curved surface thus saving processing time.

Figure 4:
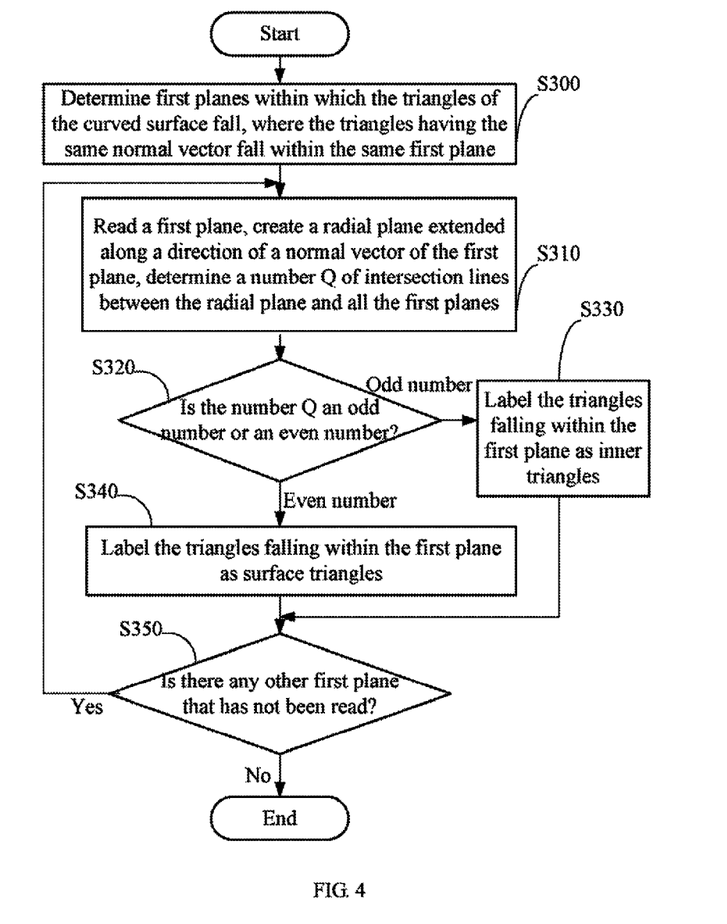
FIG. 4 is a detailed description of another step in FIG. 2.
Figure 5:
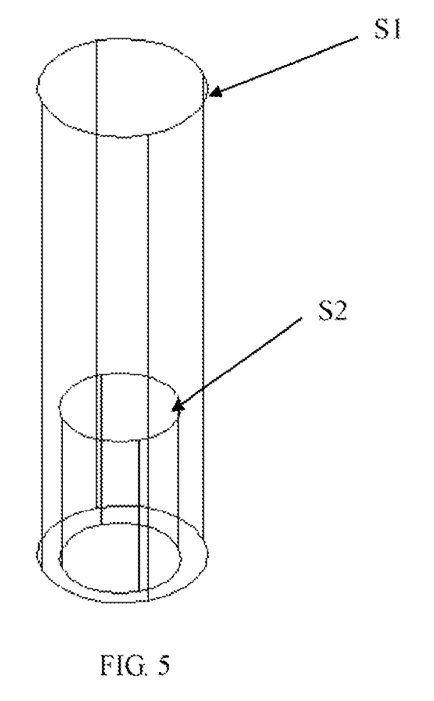
FIG. 5 is one example shows a curved surface having an inner surface and an outside surface.
Figure 6:
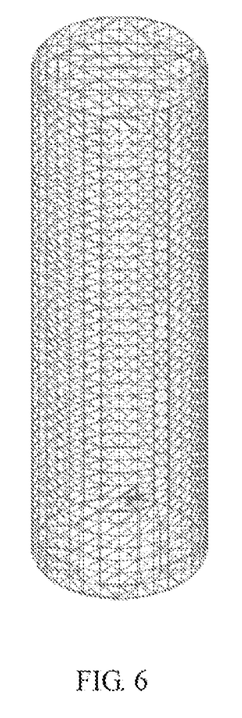
FIG. 6 illustrates triangulating the outside surface of the curved surface in FIG. 5.

In step S30, the inner triangle deleting module 13 recognizes inner triangles and surface triangles of the curved surface, and deletes the inner triangles of the curved surface (a detailed description is given in FIG. 4). As shown in FIG. 5, for example, a curved surface includes an outside surface S1 and an inner surface S2. After executing step S10, the outside surface S1 and the inner surface S2 shown in FIG. 5 are both rendered using triangles. Triangles of the outside surface S1 are regarded as the surface triangles, and triangles of the inner surface S2 are regarded as the inner triangles. After deleting the inner triangles, as shown in FIG. 6, only the surface triangles are displayed.

In step S40, the multi-thread execution module 14 determines a number N of execution cores (or execution units) that the processor 30 may have, and creates a number N of threads accordingly. For example, if the processor 30 has twelve execution cores, the multi-thread execution module 14 creates twelve threads.

In step S50, the multi-thread execution module 14 groups the surface triangles into a plurality of groups, and randomly assigns the groups to the number N threads, where the number N threads synchronously read information recorded in the processed data structures of the surface triangles and output the surface triangles of the curved surface to the display device 40. For example, if the curved surface has 1200 surface triangles, the multi-thread execution module 14 may group the 1200 surface triangles into 400 groups, and randomly assign the 400 groups between the twelve threads, and the twelve threads synchronously output the 1200 surface triangles to the display device 40.

FIG. 4 is a detailed description of step S30 in FIG. 2. Depending on the embodiment, additional steps may be added, others removed, and the ordering of the steps may be changed.

In step S200, the repetitive vertexes processing module 12 determines a maximum bounding box of the curved surface, and divides the maximum bounding box into a plurality of small bounding boxes, where each triangle of the curved surface falls within or passes through a small bounding box. The maximum bounding box is a cuboid that encloses the curved surface. The repetitive vertexes processing module 12 further records associations between the small bounding boxes and the triangles of the curved surface.

In step S210, the repetitive vertexes processing module 12 reads two neighboring small bounding boxes (such as a box b1 and a box b2), and reads coordinate data of vertexes of two triangles associated with the two neighboring small bounding boxes.

In step S220, the repetitive vertexes processing module 12 determines if the two triangles have vertexes with the same coordinate data. If the two triangles do not have any vertexes with the same coordinate data, step S240 is implemented. If the two triangles do have any vertexes with the same coordinate data, step S230 is implemented.

In step S230, the repetitive vertexes processing module 12 represents the vertexes with the same coordinate data with the same symbol. For example, if the triangle A mentioned above is associated with the box b1, and the triangle B is associated with the box b2; the data structure of the triangle A is [P1(x1,y1,z1), P2(x2,y2,z2), P3(x3,y3,z3)], and the data structure of triangle B is [P4(x1,y1,z1), P5(x5,y5,z5), P6(x6,y6,z6)]. The repetitive vertexes processing module 12 determines that the vertex P1 of the triangle A has the same coordinate data as the vertex P4 of the triangle B, then the symbol "P4" in the data structure of triangle B is replaced with the symbol "P1," and thereafter the data structure of triangle B will be [P1(x1,y1,z1), P5(x5,y5,z5), P6(x6,y6,z6)].

In step S240, the repetitive vertexes processing module 12 determines if there is any other small bounding box that has not been read. If there is any other small bounding box that has not been read, the procedure returns to step S210, the repetitive vertexes processing module 12 reads next two neighboring small bounding boxes in the sequence, such as reading two neighboring small bounding boxes b2 and b3, and executes steps S220 and S230 until all the small bounding boxes have been read.

FIG. 3 FIG. 4 is a detailed description of step S30 in FIG. 2. Depending on the embodiment, additional steps may be added, others removed, and the ordering of the steps may be changed.

Figure 7:
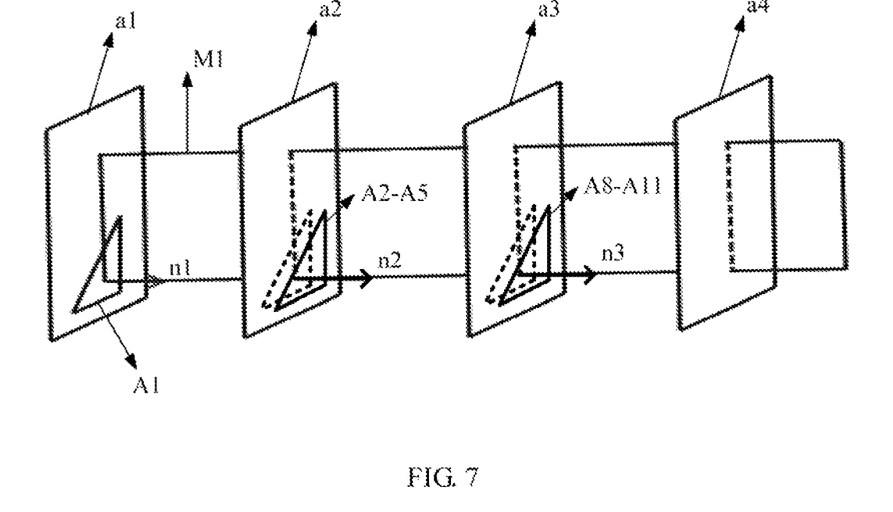
FIG. 7 illustrates a first plane within which a triangle of the curved surface falls and a radial plane extended along a direction of a normal vector of the first plane.

In step S300, the inner triangle deleting module 13 determines first planes within which the triangles of the curved surface fall, where the triangles having the same normal vector fall within the same first plane. For example, as shown in FIG. 7, a triangle A1 may have a normal vector n1 that is different from normal vectors of other triangles, triangles A2-A5 may have the same normal vector n2, and triangles A8-A11 may have the same normal vector n3; in this case, the inner triangle deleting module 13 determines a first plane a1 within which the triangle A1 falls, determines a first plane a2 within which the triangles A2-A5 fall, and determines a first plane a3 within which the triangles A8-A11 fall.

In step S310, the inner triangle deleting module 13 reads a first plane, creates a radial plane extended along a direction of a normal vector of the first plane, and determines a number Q of intersection lines between the radial plane and all the first planes. For example, as shown in FIG. 7, a radial plane M1, which is extended along a direction of the normal vector of the first plane a1, intersects with the first planes a1-a4.

In step S320, the inner triangle deleting module 13 determines if the number Q is an odd number or an even number. If the number Q is odd, step S330 is implemented. If the number Q is even, step S340 is implemented.

Figure 8:
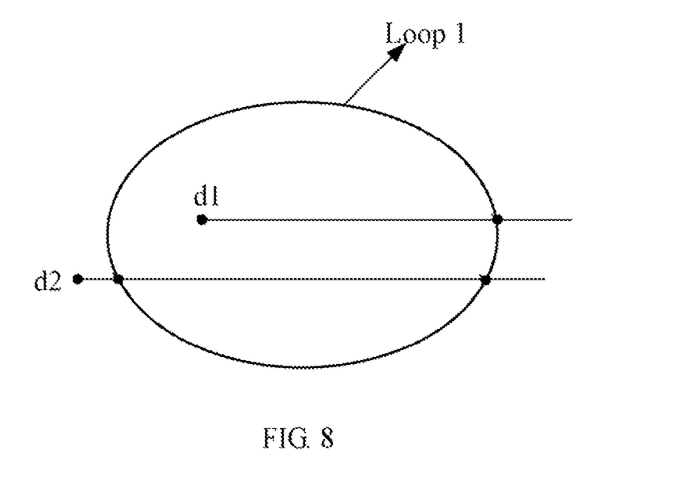
FIG. 8 gives two-dimensional graphics to illustrate determining whether the triangle in FIG. 7 is an inner triangle or a surface triangle by determining whether a number Q of intersection lines between the radial plane and the first planes is odd or even.

In step S330, the inner triangle deleting module 13 labels the triangles falling within the first plane as inner triangles. Then the procedure goes to step S350. For example, if Q=3, then the triangle A1 falling within the first plane a1 is assigned a flag "I" that represents the triangle A1 is an inner triangle of the curved surface. FIG. 8 illustrates two-dimensional graphics for determining whether a triangle is an inner triangle or a surface triangle by determining whether the number Q of the intersection lines is odd or even. As shown in FIG. 8, a loop 1 is a closed curve, a point d1 is within the loop 1, and a point d2 is outside of the loop 1. The loop 1 represents the curved surface that forms a closed region in three-dimensional space, the point d1 represents an inner plane of the curved surface, and the point d2 represents an outside plane of the curved surface. As seen from FIG. 8, a radial line extending from the point d1 has one (an odd number) intersection point with the loop 1, and a radial line extending from the point d2 has two (an even number) intersection points with the loop 1.

In step S340, the inner triangle deleting module 13 labels the triangles falling within the first plane as surface triangles. For example, if Q=4, then the triangle A1 falling within the first plane a1 is assigned a flag "S" that represents the triangle A1 is an inner triangle of the curved surface.

In step S350, the inner triangle deleting module 13 determines if there is any other first plane that has not been read. If there is any first plane that has not been read, the procedure returns to step S310 until all first planes have been read so that every triangle of the curved surface has been determined as being an inner triangle or a surface triangle.

Although certain exemplary embodiments of the present disclosure have been specifically described, the present disclosure is not to be construed as being limited thereto. Various changes or modifications may be made to the present disclosure without departing from the scope and spirit of the present disclosure.

What is claimed is:

1. A method being executed by a processor of a computing device for processing a curved surface of a product, the method comprising:
    (a) meshing the curved surface into a plurality of triangles, and recording symbols and coordinate data of three vertexes of each triangle into a data structure of the triangle;
    (b) representing vertexes having the same coordinate data with the same symbol using the data structures of the triangles;

(c) recognizing inner triangles and surface triangles of the curved surface, and deleting the inner triangles of the curved surface, wherein step (c) comprises:

determining first planes within which the plurality of triangles of the curved surface fall, wherein the plurality of triangles have the same normal vector fall within the same first plane;

reading a first plane, creating a radial plane extended along a direction of a normal vector of the first plane, and determining a number Q of intersection lines between the radial plane and all the first planes; and labeling the plurality of triangles falling within the first plane as the inner triangles when the number Q is an odd number, and labeling the plurality of triangles falling within the first plane as the surface triangles when the number Q is an even number; and (d) reading information recorded in the processed data structures of the surface triangles and outputting the surface triangles of the curved surface to a display device.

2. The method of claim 1, wherein step (b) comprises:

determining a maximum bounding box of the curved surface, and dividing the maximum bounding box into a plurality small bounding boxes, wherein each triangle of the curved surface is associated with a small bounding box;

reading each two neighboring small bonding boxes, and reading coordinate data of vertexes of two triangles associated with the two neighboring small bounding boxes;

determining if the two triangles have vertexes having the same coordinate data; and representing the vertexes having the same coordinate data with the same symbol, when the two triangles have vertexes having the same coordinate data.

3. The method of claim 2, wherein each triangle of the curved surface falls within or passes through a small bounding box.

4. The method of claim 1, wherein step (d) comprises:

determining a number N of execution cores that the processor has, and creating a number N of threads accordingly;

grouping the surface triangles into a plurality of groups, and randomly assigning the groups to the number N threads; and synchronously reading information recorded in the processed data structures of the surface triangles and outputting the surface triangles of the curved surface to the display device by the number N threads.

5. The method of claim 1, before step (a) further comprising:

obtaining point-cloud data of the product by a point-cloud data acquiring device electronically connected to the computing device, and creating the curved surface based on the point-cloud data.

6. A computing device, comprising:

at least one processor;

a storage device; and one or more programs stored in the storage device and executed by the at least one processor to perform a method comprising steps:

(a) meshing the curved surface into a plurality of triangles, and recording symbols and coordinate data of three vertexes of each triangle into a data structure of the triangle;

(b) representing vertexes having the same coordinate data with the same symbol using the data structures of the triangles;

(c) recognizing inner triangles and surface triangles of the curved surface, and deleting the inner triangles of the curved surface, wherein step (c) comprises:

determining first planes within which the plurality of triangles of the curved surface fall, wherein the plurality of triangles have the same normal vector fall within the same first plane;

reading a first plane, creating a radial plane extended along a direction of a normal vector of the first plane, and determining a number Q of intersection lines between the radial plane and all the first planes; and labeling the plurality of triangles falling within the first plane as the inner triangles when the number Q is an odd number, and labeling the plurality of triangles falling within the first plane as the surface triangles when the number Q is an even number; and (d) reading information recorded in the processed data structures of the surface triangles and outputting the surface triangles of the curved surface to a display device.

7. The computing device of claim 6, wherein step (b) comprises:

determining a maximum bounding box of the curved surface, and dividing the maximum bounding box into a plurality small bounding boxes, wherein each triangle of the curved surface is associated with a small bounding box;

reading each two neighboring small bonding boxes, and reading coordinate data of vertexes of two triangles associated with the two neighboring small bounding boxes;

determining if the two triangles have vertexes having the same coordinate data; and representing the vertexes having the same coordinate data with the same symbol, when the two triangles have vertexes having the same coordinate data.

8. The computing device of claim 7, wherein each triangle of the curved surface falls within or passes through a small bounding box.

9. The computing device of claim 6, wherein step (d) comprises:

determining a number N of execution cores that the at least one processor has, and creating a number N of threads accordingly;

grouping the surface triangles into a plurality of groups, and randomly assigning the groups to the number N threads; and synchronously reading information recorded in the processed data structures of the surface triangles and outputting the surface triangles of the curved surface to the display device by the number N threads.

10. The computing device of claim 6, before step (a) further comprising:

obtaining point-cloud data of the product by a point-cloud data acquiring device electronically connected to the computing device, and creating the curved surface based on the point-cloud data.

11. A non-transitory storage medium storing a set of instructions, the set of instructions capable of being executed by a processor of a computing device for processing a curved surface of a product, the method comprising:

(a) meshing the curved surface into a plurality of triangles, and recording symbols and coordinate data of three vertexes of each triangle into a data structure of the triangle;

(b) representing vertexes having the same coordinate data with the same symbol using the data structures of the triangles;

(c) recognizing inner triangles and surface triangles of the curved surface, and deleting the inner triangles of the curved surface, wherein step (c) comprises:

determining first planes within which the plurality of triangles of the curved surface fall, wherein the plurality of triangles have the same normal vector fall within the same first plane;

reading a first plane, creating a radial plane extended along a direction of a normal vector of the first plane, and determining a number Q of intersection lines between the radial plane and all the first planes; and labeling the plurality of triangles falling within the first plane as the inner triangles when the number Q is an odd number, and labeling the plurality of triangles falling within the first plane as the surface triangles when the number Q is an even number; and (d) reading information recorded in the processed data structures of the surface triangles and outputting the surface triangles of the curved surface to a display device.

12. The medium of claim 11, wherein step (b) comprises:

determining a maximum bounding box of the curved surface, and dividing the maximum bounding box into a plurality small bounding boxes, wherein each triangle of the curved surface is associated with a small bounding box;

reading each two neighboring small bonding boxes, and reading coordinate data of vertexes of two triangles associated with the two neighboring small bounding boxes;

determining if the two triangles have vertexes having the same coordinate data; and representing the vertexes having the same coordinate data with the same symbol, when the two triangles have vertexes having the same coordinate data.

13. The medium of claim 12, wherein each triangle of the curved surface falls within or passes through a small bounding box.

14. The medium of claim 11, wherein step (d) comprises:

determining a number N of execution cores that the processor has, and creating a number N of threads accordingly;

grouping the surface triangles into a plurality of groups, and randomly assigning the groups to the number N threads; and synchronously reading information recorded in the processed data structures of the surface triangles and outputting the surface triangles of the curved surface to the display device by the number N threads.

15. The medium of claim 11, before step (a) further comprising:

obtaining point-cloud data of the product by a point-cloud data acquiring device electronically connected to the computing device, and creating the curved surface based on the point-cloud data.

\* \* \* \* \*